United States Patent

Suzuki

[19]

[11] Patent Number: 5,816,465
[45] Date of Patent: Oct. 6, 1998

[54] BRANCHING APPARATUS FOR A PAPER-WEB THREADING GUIDE OF A ROTARY PRESS

[75] Inventor: Kunio Suzuki, Yokohama, Japan

[73] Assignee: Tokyo Kikai Seisakusho, Ltd., Tokyo, Japan

[21] Appl. No.: 856,690

[22] Filed: May 15, 1997

[30] Foreign Application Priority Data

Sep. 25, 1996 [JP] Japan .................................. 8-272912

[51] Int. Cl.$^6$ ...................................................... G03B 1/56
[52] U.S. Cl. ............................................................. 226/92
[58] Field of Search ........................ 226/92, 110; 414/20; 101/228

[56] References Cited

U.S. PATENT DOCUMENTS

| | | | |
|---|---|---|---|
| 3,995,553 | 12/1976 | Winterholler et al. | 226/92 X |
| 4,370,927 | 2/1983 | Fischer | 226/92 X |
| 4,987,830 | 1/1991 | Fukuda et al. | 226/92 X |
| 5,052,295 | 10/1991 | Suzuki et al. | 226/92 X |
| 5,320,039 | 6/1994 | Reponty et al. | 226/92 X |
| 5,400,940 | 3/1995 | Sato et al. | 226/92 |

FOREIGN PATENT DOCUMENTS

5-77390  3/1993  Japan .
6-88695  11/1994  Japan .

*Primary Examiner*—John M. Jillions
*Attorney, Agent, or Firm*—Armstrong, Westerman, Hattori, McLeland & Naughton

[57] ABSTRACT

A branching apparatus is provided in a paper-web threading apparatus of a rotary press in which, in order to thread a paper web into a threading path of the rotary press, threading guides are disposed at side portions of the threading path to extend therealong, thereby forming a threading-member traveling path through which a threading member can travel. The branching apparatus includes a branch threading guide in which a plurality of downstream threading-member traveling paths are formed such that they communicate with a single upstream threading-member traveling path via respective branching points, shifters disposed in the vicinity of the branch threading guide and having guide edges which operates at the branching points of the branch threading guide so as to guide the threading member to a selected downstream threading-member traveling path while closing the unselected downstream threading-member traveling path, and a drive for moving the shifter so as to selectively open and close the downstream threading-member traveling paths. It is possible to allow smooth traveling of the threading member. In addition, the branching apparatus can be simplified and be made compact.

8 Claims, 7 Drawing Sheets

BRANCHING APPARATUS FOR A PAPER-WEB THREADING GUIDE OF A ROTARY PRESS

BACKGROUND OF THE INVENTION

1. Field of the Invention

The present invention relates to a branching apparatus for a paper-web threading guide disposed in a threading path in a paper-web threading apparatus of a rotary press, through which a paper web is passed for printing.

2. Discussion of the Related Art

Conventional branching apparatuses disposed in a paper-web threading guide of a rotary press are disclosed in, for example, Japanese Patent Publication (kokoku) No. 6-88695 and Japanese Patent Application Laid-Open (kokai) No. 5-77390.

In these apparatuses, a branching block having a plurality of branching paths and serving as a branching apparatus, a stationary threading guide having a guide groove and located on the upstream side of the branching block, and a stationary threading guide having a plurality of guide grooves and located on the downstream side of the branching block are disposed along a threading path in a separated manner.

The branching block having a plurality of branching paths is connected to drive means composed of a single-or double-acting type fluid cylinder. The branching block is moved to a plurality of positions through operation of the fluid cylinder so as to cause a desired one of the plurality of branching paths to communicate with the guide groove of the upstream stationary threading guide. With this operation, the guide groove of the upstream stationary threading guide communicates with a selected desired one of the plurality of guide grooves of the downstream stationary threading guide via the branching path.

The branching block may be in the form of a linear motion type or a rotary type. In the former case, the branching block is moved along a straight line through operation of the fluid cylinder. In the latter case, the branching block is rotated through operation of the fluid cylinder.

Upon operation of the branching apparatus of the threading guide, a threading member is caused to travel from the guide groove of the upstream stationary threading guide to the selected groove of the downstream stationary threading guide, so that the threading member guides a paper web to travel along a selected predetermined threading path.

In the above-described conventional branching apparatus for a threading guide, the branching block having a plurality of branching paths and serving as the branching apparatus is disposed movably between the upstream and the downstream stationary threading guides such that it is in contact with both stationary threading guides. Therefore, in order to allow the threading member to travel smoothly through the guide groove of the upstream stationary threading guide, the branching path of the branching block, and the guide groove of the downstream stationary threading guide, the end surfaces of the branching block must be movable relative to and in close contact with the end surfaces of the upstream and downstream stationary threading guides. Moreover, at each of the plurality of positions to which the branching block is moved, the selected branching path must correspond accurately, at its opposite ends, to the respective guide grooves of the upstream and downstream stationary threading guides.

If the above-described requirements are not satisfied, the tip end of the traveling threading member is caught by slight steps formed between the end surfaces of the upstream and downstream stationary threading guides and the end surfaces of the branching block, so that the traveling of the threading member is hindered.

However, in order to ensure that the end surfaces of the branching block are movable relative to the end surfaces of the upstream and downstream stationary threading guides in a closely contacted manner and that each selected branching path corresponds accurately, at its opposite ends, to the guide grooves of the upstream and downstream stationary threading guides, considerably high accuracy is needed in machining and assembly of the above-described components and in movement of the branching block provided by the drive means composed of the fluid cylinder. The realization of such high accuracy is very difficult, partially because of the small widths of the guide grooves and the branching paths. This also increases production costs of the apparatus.

When the number of branches increases, the number of the branching paths of the branching block and the size of the branching block also increase, so that the branching apparatus for the threading guide must move the branching block having an increased size. Accordingly, the branching apparatus inevitably becomes bigger. Accordingly, there arises an additional problem that a larger space is required in order to install the branching apparatus in the threading guide.

SUMMARY OF THE INVENTION

An object of the present invention is to completely solve the above-described problems involved in the conventional branching apparatus for a threading guide.

Another object of the present invention is to provide a branching apparatus for a threading guide of a rotary press, which ensures smooth traveling of a threading member and which is simple and compact.

In order to achieve the above objects, the present invention provides an improved branching apparatus for a threading guide of a rotary press. The branching apparatus is provided in a paper-web threading apparatus in which, in order to thread a paper web into a threading path of the rotary press, threading guides are disposed at side portions of the threading path to extend therealong, thereby forming a threading-member traveling path through which a threading member can travel. The branching apparatus includes a branch threading guide in which a plurality of downstream threading-member traveling paths are formed such that they communicate with a single upstream threading-member traveling path via respective branching points, shifters disposed in the vicinity of the branch threading guide and having guide edges which operate at the branching points of the branch threading guide so as to guide the threading member to a selected downstream threading-member traveling path while closing the unselected downstream threading-member traveling path or paths, and drive means for moving the shifters so as to selectively open and close the downstream threading-member traveling paths.

Preferably, on the upstream introduction side, the guide edge of each shifter has a slanted or arcuate shape so that the distance between the guide edge and the threading-member traveling path increases toward upstream side. Preferably, two pairs of shifters are disposed along two parallel planes so as to restrict the widthwise sides of the forward end portion of the threading member, thereby introducing the threading member into a selected downstream threading-member traveling path. Alternatively, a single pair of shifters are disposed along a single plane such that they penetrate the branch threading guide, the shifters restricting the widthwise center portion of the forward end portion of the threading ember, thereby introducing the threading member into a selected downstream threading-member traveling path.

In the above-described branching apparatus for a threading guide of a rotary press, in the middle of a threading path starting from an upstream paper feed section and ending at a downstream folding section, a threading member bonded to the forward end of each transversal edge of a paper web travels along a predetermined threading-member traveling path while being guided by the threading guides. As a result, the paper web is threaded along a predetermined threading path.

At a branching point of the threading path, i.e., at a branching point of the threading-member traveling path, the threading member travels toward a threading-member traveling path selected by the branching apparatus, so that the paper web is threaded along a selected threading path.

The selection of a threading-member traveling path at the branching point is performed through movement of the shifters to a desired position by the drive means. The threading member that had traveled along the upstream threading-member traveling path while having been guided by the threading guide and that has reached the branching portion of the threading guide is prevented from entering the unselected downstream threading-member traveling path or paths that are closed by the guide edge of the shifter, but is allowed to enter the selected downstream threading-member traveling path into which the threading member is guided by the guide edge of the shifter, so that the threading member travels along the selected downstream threading-member traveling path.

On the upstream introduction side, the guide edge of the shifter has a slanted or arcuate shape so that the distance between the guide edge and the threading-member traveling path increases toward the upstream side. Therefore, the tip end of the traveling threading member engages smoothly with the guide edge of the shifter when the threading member is guided by the guide edge of the shifter.

In the branching apparatus for a paper-web threading apparatus of a rotary press according to the present invention, a threading guide in a single path region and a plurality of threading guides in branching regions are continuously formed to have simple shapes and no steps are formed in the threading guide. Accordingly, no difficulty arises in manufacture, and there is no possibility that the tip end of a traveling threading member becomes caught due to a step in the threading guide.

Moreover, selection of a threading-member traveling path at the branching point is carried out by means of a small shifter, which is disposed in the vicinity of the branching point, as a part different from the threading guide. Accordingly, it is sufficient for the shifter to be position-adjusted with relatively low accuracy, thus facilitating assembly of the apparatus. In addition, since the selection of a threading-member traveling path is not performed through movement of the threading guide but is performed through movement of the shifters, the branching apparatus itself can be made compact so as to reduce the installation space.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF PREFERRED EMBODIMENTS

Branching apparatuses for a threading guide of a rotary press according to embodiments of the present invention will now be described with reference to the drawings.

Figure 1A:
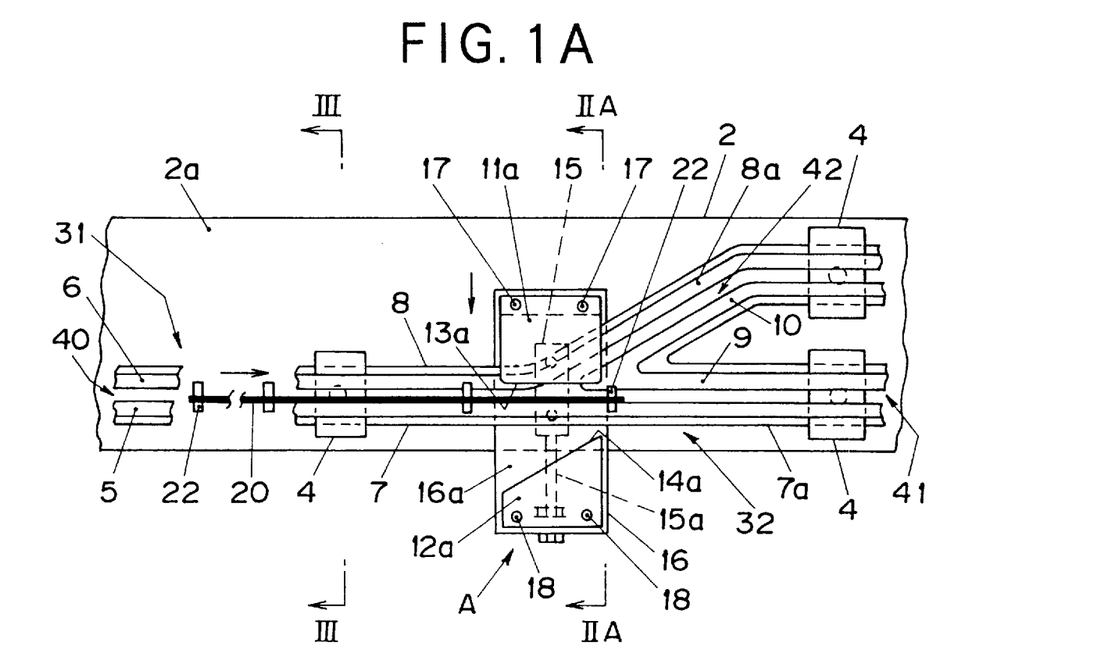
FIGS. 1A and 1B each show a front view of a threading branching apparatus according to a first embodiment of the present invention.
Figure 1B:
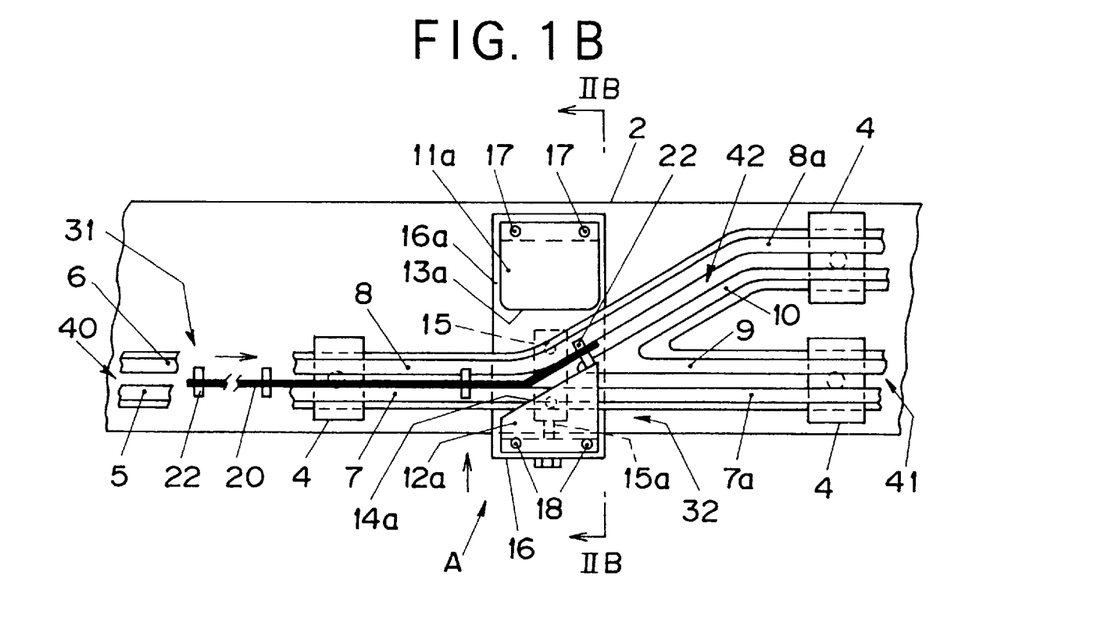

First, a description will be given of a branching apparatus for a threading guide of a rotary press according to a first embodiment of the present invention. It is to be noted that, in the descriptions, directions (upward, downward, rightward, and leftward) denote directions in FIGS. 1A and 1B, and that in each drawing the direction of a threading-member traveling path after a branching point represents an exemplary direction.

A threading guide is disposed on the inner surface of a frame of the rotary press along a threading path that extends in a range from an upstream paper feed section to a downstream folding section.

As shown in FIGS. 1A, 1B, 2A, and 2B, a long bracket 2 having an inverted-L-shaped cross section is attached to each inner surface of the frame 1 of the rotary press such that the bracket 2 extends in the direction of the threading path. That is, the edge of one side portion of the bracket 2 is fixed to the corresponding inner surface of the frame 1, while the other side portion of the bracket 2 forms a vertical portion 2a having a flat surface separated from the corresponding inner surface of the frame.

Figure 9:
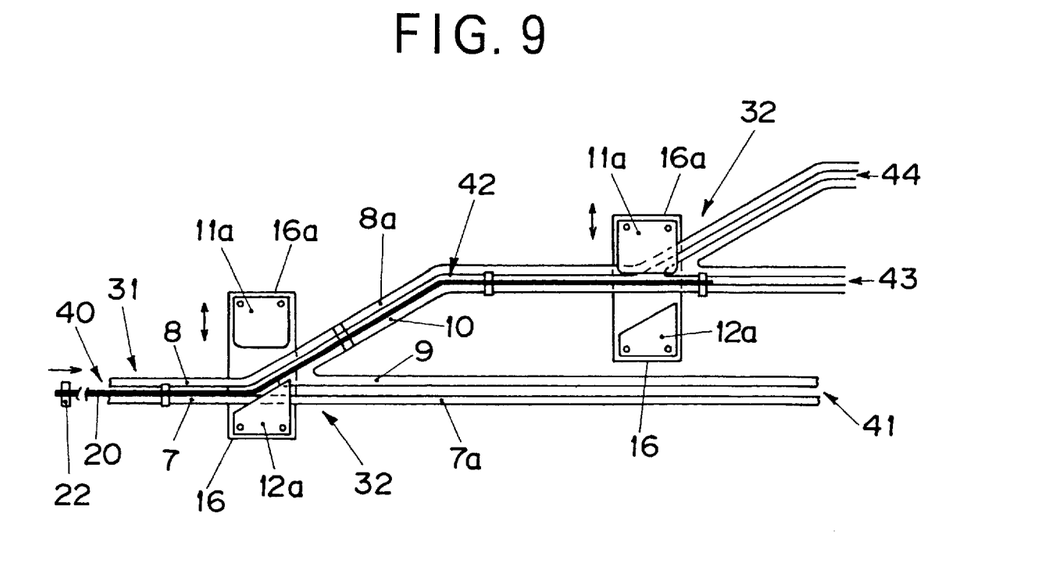
FIG. 9 is a front view showing an example in which the threading branching apparatus according to the first or second embodiment of the present invention is applied to multiple branching.

In the threading guide, there exists an upstream (left side) single path region 31 and a downstream (right side) branch region 32, which is connected to the single path region 31 and in which a single threading path is branched into a plurality of threading paths. A plurality of single path regions follow the branch region 32, and a different branch region 32 is connected to each single path region 31, as shown in FIG. 9, thereby increasing the number of branches.

Each single path region 31 of the threading guide is supported by guide support brackets 4 disposed at proper intervals in the threading direction, so that the entire threading guide is mounted to the bracket 2, i.e., the frame 1.

In the single path region 31, long threading guide members 5 and 6 are disposed in parallel to each other with a predetermined clearance, which is greater than the thickness of a later-described threading member 20, in the direction perpendicular to a paper web, thereby forming a threading-member traveling path 40 through which the threading member 20 can travel.

At locations where the guide support brackets 4 are disposed, the two parallel threading guide members 5 and 6 are fixed to the tip ends of both legs of each guide support bracket 4, which has a C-shaped cross section. The base portion of each guide support bracket 4 is fixed to the lower end of the vertical portion 2a of the bracket 2. In this way, the threading guide members 5 and 6 are attached to the frame 1 such that they are properly separated from the inner surface of the frame 1 in the widthwise direction of the paper web.

Figure 11:
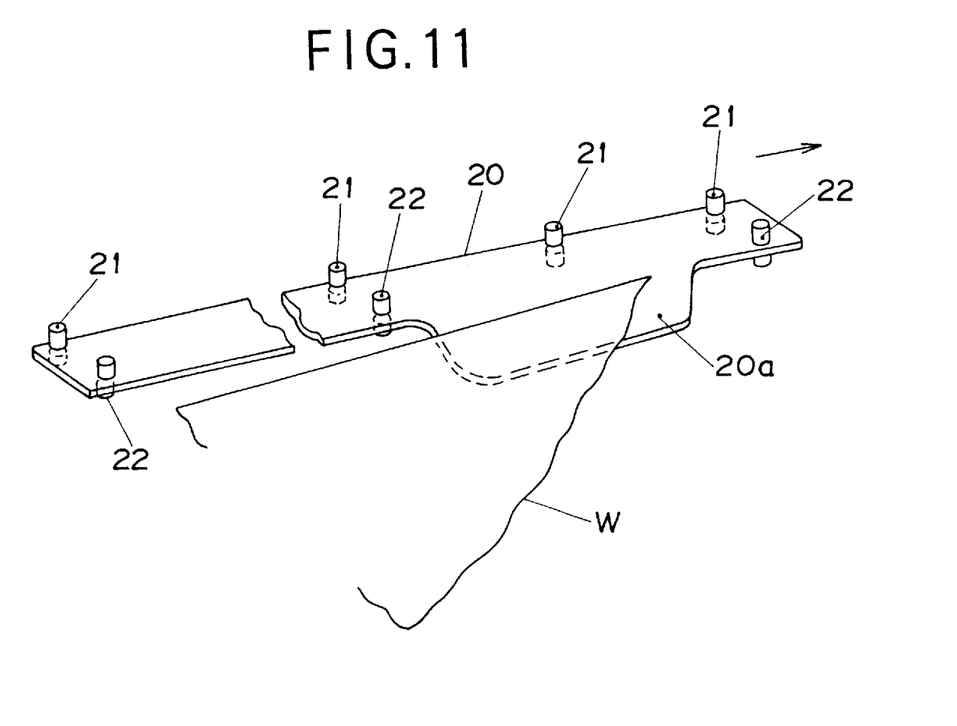
FIG. 11 is a perspective view of a threading member used in the embodiments of the present invention.

Drive rollers (not shown) are disposed along the threading paths at a pitch smaller than the length of the threading member 20, and are driven by unillustrated drive means. The threading guide 20, which is nipped by the paired drive rollers and is fed thereby, travels through the threading-member traveling path 40 while being guided. As shown in FIG. 11, the threading member 20 is a flexible strip having a predetermined length. A paper-web bonding portion 20a projects sidewise from the forward end portion of the threading member 20. The threading member 20 is inserted between the upper and lower threading guides 5 and 6 and is forced to travel. A plurality of guide pins 21 and 22 are disposed in line at opposite transverse sides of the threading member 20 such that they project from the top and bottom surfaces of the threading member 20.

The array of guide pins 21 and the array of guide pins 22 are disposed on opposite sides of the threading guide members 5 and 6. Accordingly, during traveling, the threading member 20 is guided by the threading guide members 5 and 6, and is prevented, by the array of guide pins 21 and the array of guide pins 22, from moving in the widthwise direction of the paper web W with respect to the threading guide members 5 and 6.

The threading member 20 is inserted such that the paper-web bonding portion 20a projects from the threading member 20 in the direction opposite to the bracket 2. The forward end portion of each side edge of the paper web W is bonded to the paper-web bonding portion 20a.

Lower and upper threading guide members 7 and 8 of the branch region 32 follow the threading guide members 5 and 6 of the single path region 31. Among the threading guide members 7 and 8, the lower threading guide member 7 extends straight even after passing through the branching point and becomes a threading guide member 7a, while the upper guide member 8 bends at a predetermined angle at the branching point so as to branch obliquely and then becomes a threading guide member 8a. The threading guide member 8a bends again so as to be parallel to the threading guide member 7a.

There is further disposed a branch threading guide member having a V-shaped end portion and composed of threading guide members 9 and 10, which are parallel to the threading guide members 7a and 8a, respectively. As a result, the threading-member traveling path 40 branches into a straight threading-member traveling path 41 and a slanted threading-member traveling path 42.

At the branching point in the branch region 32 is disposed a threading path switching apparatus A.

The threading path switching apparatus A has four shifters 11a, 11b, 12a, and 12b, each formed of a quadrilateral plate. These shifters 11a, 11b, 12a, and 12b are disposed in two parallel planes that are perpendicular to the paper web W and parallel to the threading-member traveling path 40. In detail, the shifters 11a and 12a are disposed in one of the parallel planes such that they face each other with a predetermined clearance and are located on the upper and lower sides of the threading-member traveling path 40. The shifters 11b and 12b are disposed in the other parallel plane such that they face each other with a predetermined clearance and are located on the upper and lower sides of the threading-member traveling path 40. As will be described later, the shifters 11a and 11b respectively face the shifters 12a and 12b with predetermined vertical clearances therebetween through which the guide pins 21 and 22 pass.

The plane in which the shifters 11a and 12a are located and the plane in which the shifters 11b and 12b are located are determined such that they are located on either side of the guide members 7, 7a, 8, 8a, 9 and 10 so as to correspond to the positions of the array of guide pins 21 and the array of guide pins 22 of the threading member 20.

The shifters 11a and 11b respectively have guide edges 13a and 13b, which respectively face the shifters 12a and 12b. These guide edges 13a and 13b are substantially parallel to the threading guide member 7. The shifters 12a and 12b respectively have guide edges 14a and 14b, which respectively face the shifters 11a and 11b. These guide edges 14a and 14b are substantially parallel to that portion of the threading guide member 8a, which extends obliquely.

The length of the shifters 11a and 11b in the direction of the threading path is determined such that their guide edges 13a and 13b become longer than the horizontal component of the clearance of the threading-member traveling path 42 at the branching point in the branching region 32; i.e., such that they have a sufficient length to close the threading path 42. The length of the shifters 12a and 12b in the direction of the threading path is determined such that the vertical component of the slanted guide edges 14a and 14b becomes larger than the clearance of the straight threading-member traveling path 41; i.e., such that they have a sufficient length to close the straight threading path 41 at the branching point in the branch region 32.

When the shifters 11a and 11b are positioned to close the slanted threading-member traveling path 42, the guide edges 13a and 13b of the shifters 11a and 11b engage with the array of guide pins 21 and 22. In this state, the guide edges 13a and 13b are spaced from the guide surfaces of the threading guide members 8 and 9 to such an extent as to allow the threading member 20 to pass through the straight threading-member traveling path 41. When the shifters 12a and 12b are positioned to close the straight threading-member traveling path 41, the guide edges 14a and 14b of the shifters 12a and 12b engage with the arrays of guide pins 21 and 22. In this state, the guide edges 14a and 14b are raised from the guide surface of the threading guide member 10 to such an extent as to allow the threading member 20 to pass through the slanted threading-member traveling path 42.

The guide edges 13a and 13b of the shifters 11a and 11b each have a slanted or arcuate shape in an upstream introduction zone or over the entire length, so that the distance between the guide edges 13a and 13b and the threading-member traveling path 40 increases toward the upstream side. As a result, when the tip ends of the arrays of guide pins 21 and 22 of the threading member 20 contact the guide edges 13a and 13b, they are smoothly guided by the guide edges 13a and 13b.

In the above-described first embodiment, the shifters 11a and 12a guide the array of guide pins 22, while the shifters 11b and 12b guide the array of guide pins 21. However, these shifters 11a, 11b, 12a, and 12b may be modified such that they guide the threading member 20 itself.

In this case as well, the above-described structure is employed. However, the shifters 11a, 11b, 12a, and 12b are designed such that when the shifters 11a and 11b are positioned to close the slanted threading-member traveling path 42, the guide edges 13a and 13b of the shifters 11a and 11b become substantially flush with the guide surfaces of the threading guide members 8 and 9, while the guide edges 14a and 14b of the shifters 12a and 12b become substantially flush with the guide surface of the threading guide member 10.

More specifically, the guide edges 13a and 13b of the shifters 11a and 11b each have a slanted or arcuate shape in an upstream introduction zone or over the entire length, so that the distance between the guide edges 13a and 13b and the threading-member traveling path 40 increases toward the upstream side. This ensures that the threading member 20 is smoothly introduced to the branching point while being prevented from engaging with the upstream introduction ends of the guide edges 13a and 13b. Moreover, in order to ensure smooth introduction of the threading member 20 into the straight threading-member traveling path 41, the downstream exit ends of the guide edges 13a and 13b are flush with the guide surface of the threading member 9 or slightly project therefrom.

Figure 4:
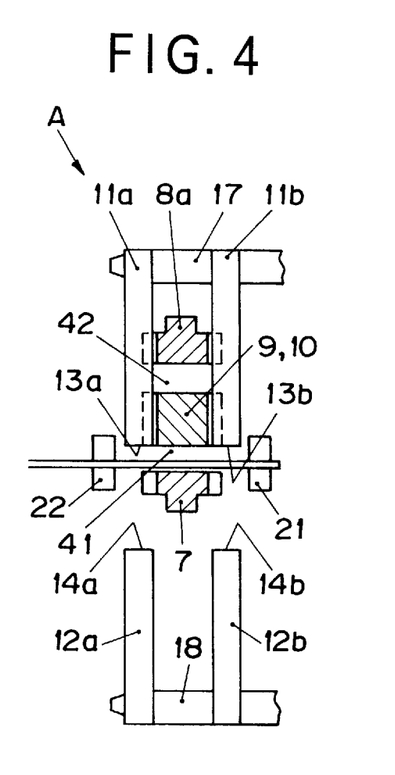
FIG. 4 is a sectional view taken along line IIA—IIA in FIG. 1A showing a first modification (A) of the first embodiment of the present invention.

In a first modification (A) shown in FIG. 4, the shifters 11a and 12a and the shifters 11b and 12b are respectively disposed at positions that are inwardly offset in the widthwise direction from the positions corresponding to the arrays of guide pins 21 and 22. In the branch region 32, through depressions are formed on both side surfaces of the guide members 7, 7a, 8, 8a, 9, and 10 so as to allow the shifters 11a and 12a and the shifters 11b and 12b to enter the depressions in the vertical direction.

Figure 5:
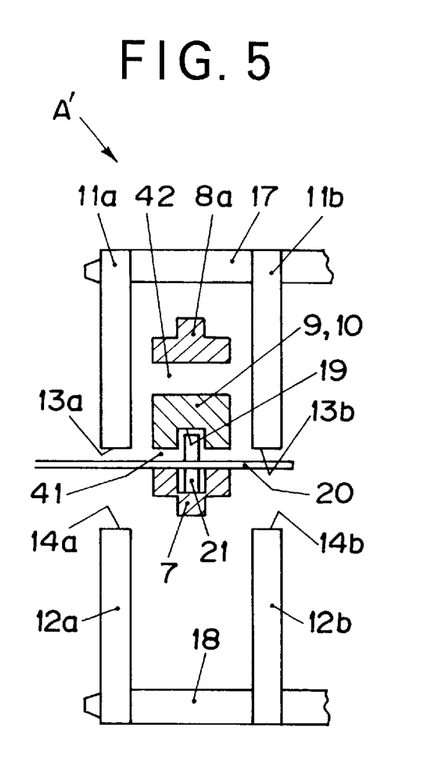
FIG. 5 is a sectional view taken along line IIA—IIA in FIG. 1A showing a second modification (B) of the first embodiment of the present invention.

In a second modification (A) shown in FIG. 5, the shifters 11a and 12a and the shifters 11b and 12b are disposed in a same manner as in the first embodiment. However, a single array of guide pins 21 are embedded into the threading member 20 at the substantially center position in the widthwise direction. Guide grooves 19, into which the upper and lower ends of the guide pins 21 are inserted, are formed in the opposite guide surfaces of all the threading guide members such that the guide grooves 19 are located at the substantially center position in the widthwise direction. Each of the threading guide members may be composed of two parallel members that are assembled such that a clearance serving as the guide groove 19 is formed therebetween.

The widthwise movement of the paper web W relative to the threading guide members 5 and 6 is prevented by the engagement between the array of guide pins 21 and the guide grooves 19.

Next, a description will be given of a threading path switching apparatus B used in a branching apparatus for a threading guide of a rotary press according to a second embodiment of the present invention.

Figure 6:
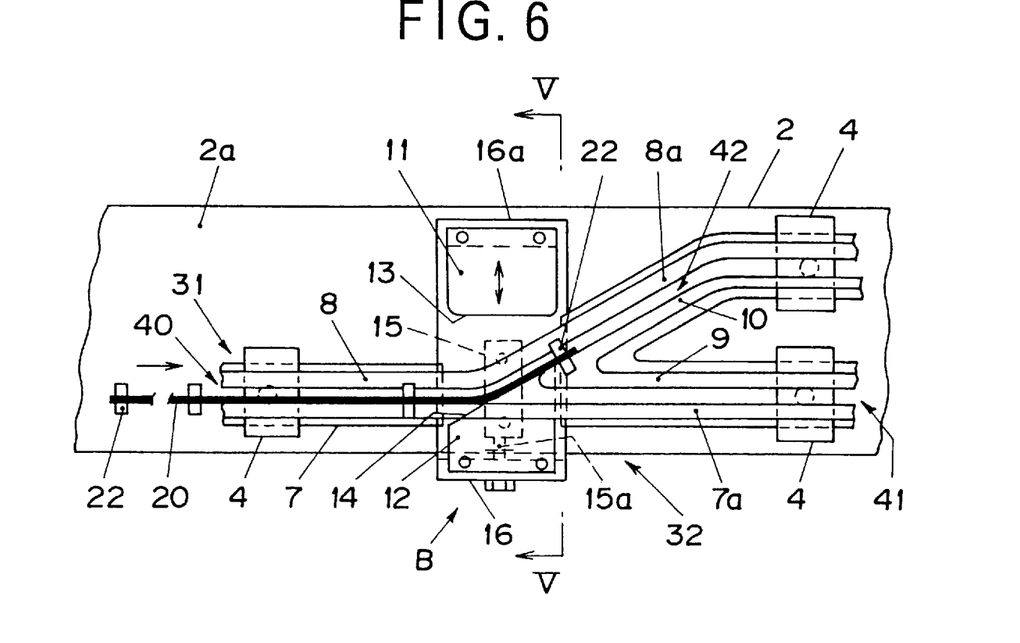
FIG. 6 shows a front view of a threading branching apparatus according to a second embodiment of the present invention.

It is to be noted that in the description directions (upward, downward, rightward, and leftward) denote directions in FIG. 6, and that in each drawing the direction of a threading-member traveling path after a branching point represents an exemplary direction.

Figure 7:
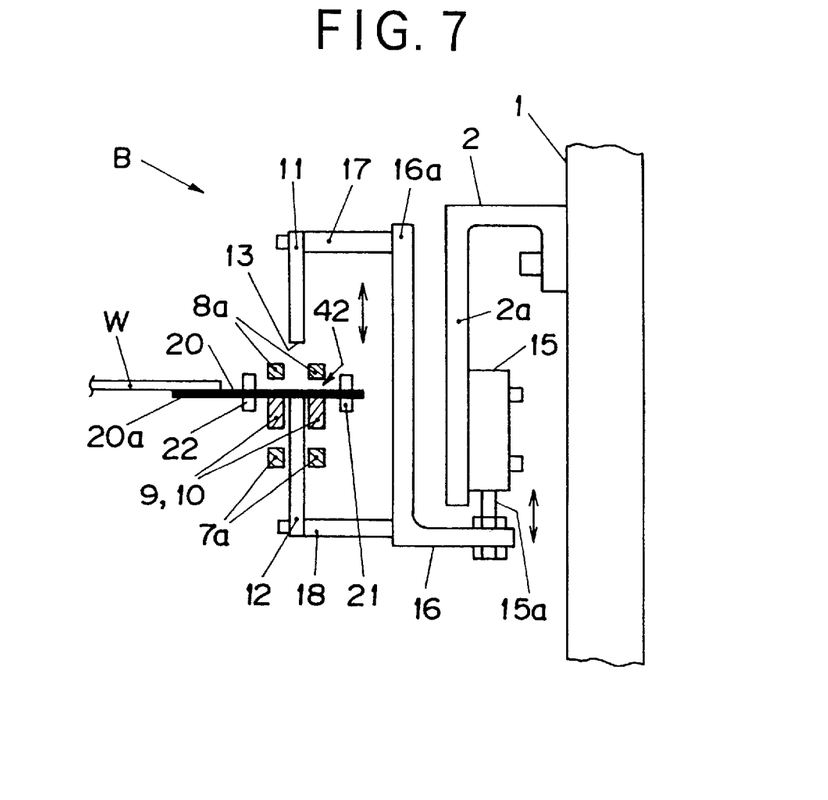
FIG. 7 is a sectional view taken along line V—V in FIG. 6.
Figure 8:
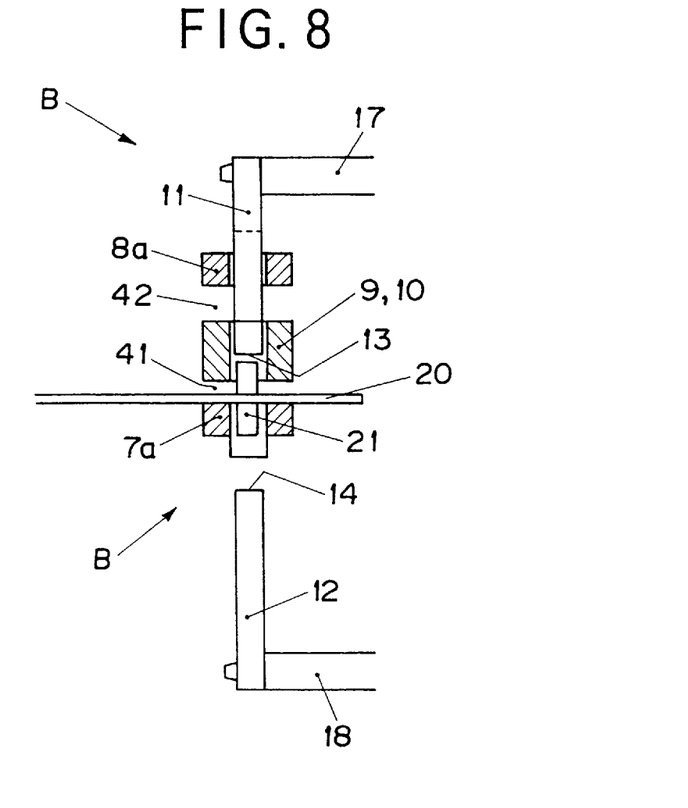
FIG. 8 is a sectioned partial view taken along line V—V in FIG. 6 showing a modification of the second embodiment of the present invention.

As shown in FIGS. 6–8, two paired shifters are disposed on the upward side and the downward side so as to face each other. This structure reduces the number of components and the size of the apparatus as compared to the threading path switching apparatus A.

That is, in the branch region 32, the paired shifters 11 and 12 facing each other are disposed at a predetermined position in the widthwise direction of the guide members 7, 7a, 8, 8a, 9, and 10.

As shown in FIG. 7, through-clearances into which the shifters 11 and 12 move are formed in the guide members 7, 7a, 8, 8a, 9, and 10 at a widthwise position corresponding to the position of the shifters 11 and 12. The guide edges 13 and 14 of the shifters 11 and 12 faces the opposite surfaces of the threading member 20. Each of the threading guide members may be composed of two parallel members that are assembled such that a through-clearances is formed therebetween.

The guide edge 13 of the shifter 11 and the guide edge 14 of the shifter 12 have shapes identical to those of the shifters according to the first embodiment.

The array of guide pins 21 and the array of guide pins 22 are disposed on the opposite sides of all the threading guide members. Accordingly, during traveling, the threading member 20 is prevented, by the array of guide pins 21 and the array of guide pins 22, from moving in the widthwise direction of the paper web W with respect to the threading guide members 5 and 6.

In a modification shown in FIG. 8, like the modification shown in FIG. 5, a single array of guide pins 21 are embedded into the threading member 20 at the substantially center position in the widthwise direction. Longitudinally extending guide grooves into which the upper and lower ends of the guide pins 21 are inserted are formed in the opposite guide surfaces of all the threading guide members. Each of the threading guide members is composed of two separated parallel members so as to form a clearance serving as the guide groove. The shifters 11 and 12 also enter the guide grooves. The guide edge 13 of the shifter 11 and the guide edge 14 of the shifter 12 have shapes identical to those of the shifters used in the first embodiment. At the branching point, the shifters 11 and 12 guide the array of guide pins 21 and the widthwise movement of the paper web W relative to all the threading guide members is prevented by the engagement between the array of guide pins 21 and the guide grooves.

In the above-described first and second embodiments (see FIGS. 2 and 7), at a position corresponding to the branching point in the branch region 32, an air cylinder 15 for vertical movement is disposed between the vertical portion 2a of the bracket 2 and the inner surface of the frame 1 and is attached to the vertical portion 2a. The air cylinder 15 is controlled by an unillustrated outside controller.

To lower end of a downwardly projecting piston rod 15a of the air cylinder 15, the edge portion of one side of a shifter mounting bracket 16 having an L-shaped cross section is attached via an adjustable mechanism. This makes it possible to adjust the position of the shifter mounting bracket 16 in the operation direction. The other side of the shifter mounting bracket 16 forms a vertical portion 16a having a flat surface separated from the vertical portion 2a of the bracket 2.

The end portions of the shifters 11a and 11b opposite the guide edges 13a and 13b (or the end portion of the shifter 11 opposite the guide edge 13) are attached to the vertical portion 16a of the shifter mounting bracket 16 via parallel mounting pins 17. The end portions of the shifters 12a and 12b opposite the guide edges 14a and 14b (or the end portion of the shifter 12 opposite the guide edge 14) are attached to the vertical portion 16a of the shifter mounting bracket 16 via parallel mounting pins 18. The reference positions of the shifters 11a, 11b, 12a, and 12b (or the shifters 11 and 12) are adjusted by the adjusting mechanism.

When the piston rod 15a is projected as a result of operation of the air cylinder 15, the shifter mounting bracket 16, i.e., the shifters 11a, 11b, 12a, and 12b (or the shifters 11 and 12) are located at the lowered position. When the piston rod 15a is retracted as a result of operation of the air cylinder 15, the shifter mounting bracket 16, i.e., the shifters 11a, 11b, 12a, and 12b (or shifters 11 and 12) are located at the elevated position.

Figure 2A:
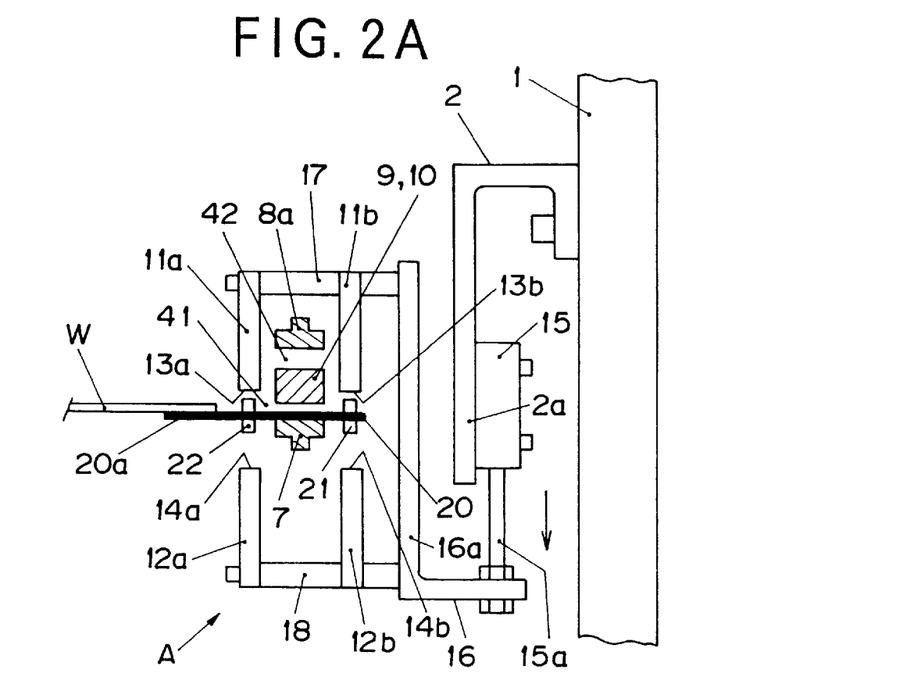
FIG. 2A is a sectional view taken along line IIA—IIA in FIG. 1A.

As shown in FIG. 2A, when the shifter mounting bracket 16 is located at the lowered position, the guide edges 14a and 14b of the shifters 12a and 12b (the guide edge 14 of the shifter 12) are separated away from the threading-member traveling path 40, while the guide edges 13a and 13b of the shifters 11a and 11b (the guide edge 13 of the shifter 11) are located at a guide pin engagement/guidance position or a threading member engagement/guidance position at which the slanted threading-member traveling path 42 is closed at the branching point and the threading guides 8 and 9 are connected. As a result, the threading-member traveling path 40 communicates with the straight threading-member traveling path 41.

Figure 2B:
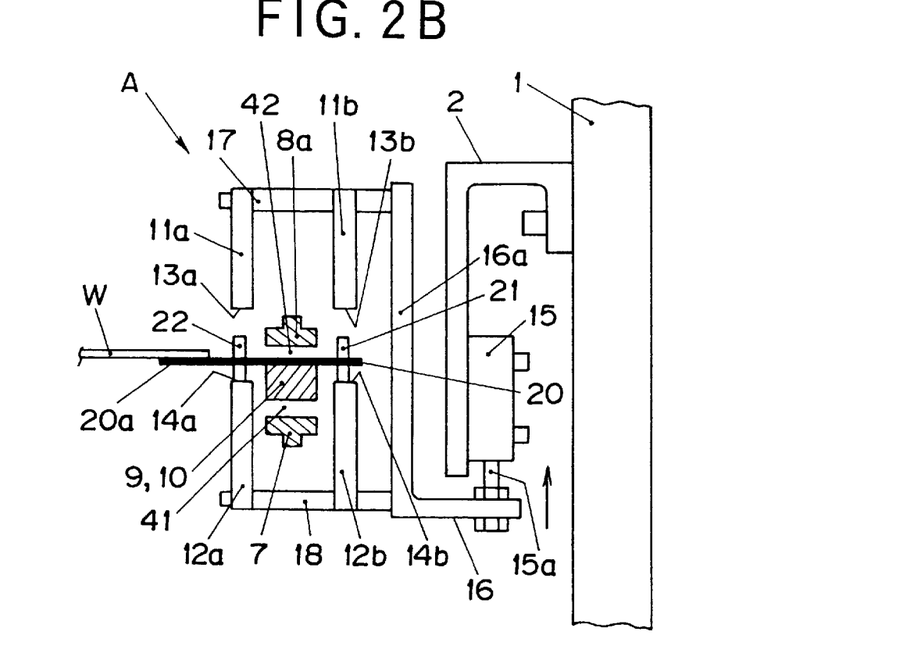
FIG. 2B is a sectional view taken along line IIB—IIB in FIG. 1B.
Figure 3:
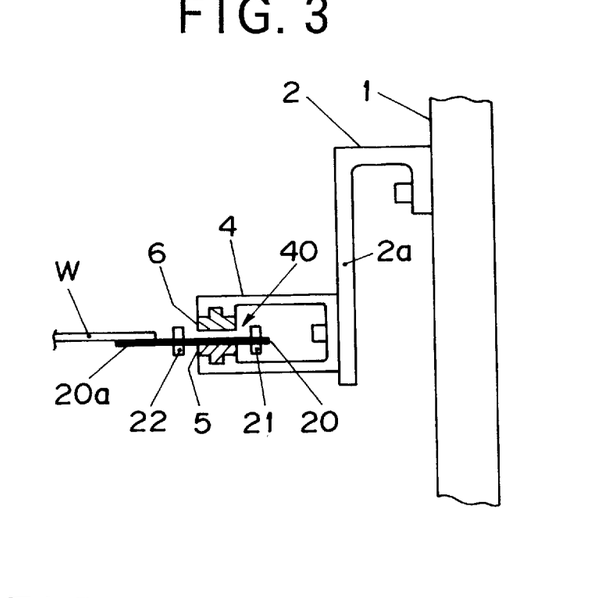
FIG. 3 is a sectional view taken along line III—III in FIG. 1A.

As shown in FIG. 2B, when the shifter mounting bracket 16 is located at the elevated position, the guide edges 13a and 13b of the shifters 11a and 11b (the guide edge 13 of the shifter 11) are separated away from the threading-member traveling path 40, while the guide edges 14a and 14b of the shifters 12a and 12b (the guide edge 14 of the shifter 12) are located at a guide pin engagement/guidance position or a threading member engagement/guidance position at which the straight threading-member traveling path 41 is closed at the branching point and the threading-member traveling path 40 is connected to the slanted threading-member traveling path 42.

Next, a description will be given of a branching apparatus for a threading guide of a rotary press according to a third embodiment of the present invention. It is to be noted that in the description directions (upward, downward, rightward, and leftward) denote directions in FIG. 10, and that in each drawing the direction of a threading-member traveling path after a branching point represents an exemplary direction.

The mutual mounting structure among the frame 1 of the rotary press, the bracket 2, the threading guide member, and the threading path switching apparatus C is the substantially the same as that of the first embodiment.

Figure 10:
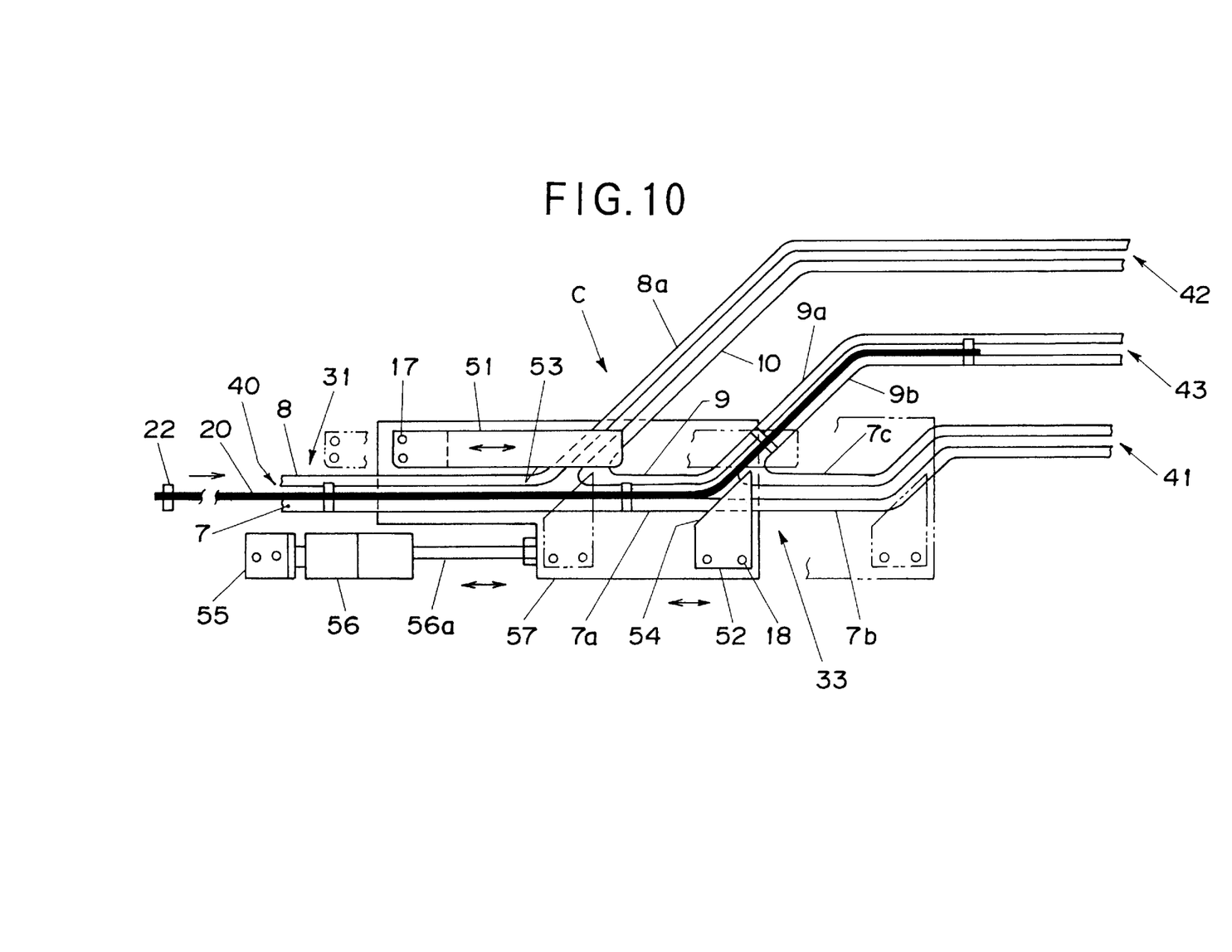
FIG. 10 is a front view of a threading branching apparatus according to a third embodiment of the present invention.

In the third embodiment shown in FIG. 10, there is provided a complex branch region 33 which is connected to the single path region 31 of the threading-member traveling path and in which the traveling-member traveling path is branched into three paths. In the complex branch region 33, there are provided lower and upper straight threading guide members 7 and 8 that follow the threading guide members of the single path region 31. Among the threading guide members 7 and 8, the lower threading guide member 7 extends straight even after passing through a first branching point and becomes a threading guide member 7a, while the upper guide member 8 bends at a predetermined angle at the first branching point so as to branch obliquely and then becomes a threading guide member 8a. The threading guide member 8a bends again so as to be parallel to the threading guide member 7a.

There is further disposed a branch threading guide member having a V-shaped end portion and composed of guide members 9 and 10, which are parallel to the threading guide members 7a and 8a, respectively. As a result, the threading-member traveling path 40 branches into a straight threading-member traveling path 41 and a slanted threading-member traveling path 42.

Moreover, among the lower threading guide member 7a and the upper threading guide member 9 that extend straight at the first branching point, the lower threading guide member 7a extends straight even after passing through a second branching point and becomes a threading guide member 7b, while the upper guide member 9 bends at a predetermined angle at the second branching point at the same angle as that of the threading guide member 8. The upper guide member 9 thus branches obliquely and then becomes a threading guide member 9a. The threading guide member 9a bends again so as to be parallel to the threading guide member 7b.

There is further disposed a branch threading guide member having a V-shaped end portion and composed of guide members 7c and 9b, which are parallel to the threading guide members 7b and 9a, respectively. As a result, the threading-member traveling path 40 branches into a straight threading-member traveling path 41 and a slanted threading-member traveling path 43.

A threading path switching apparatus C is disposed along the first and second branching points in the complex branching region 33.

The threading path switching apparatus C has a pair of shifters 51 each formed of a quadrilateral plate, and another pair of shifters 52 each formed of a trapezoidal plate. These shifters 51 and 52 are disposed in two parallel planes that are perpendicular to the paper web W and parallel to the threading-member traveling path 41, such that they are located on the opposite sides of the threading guide members 7, 7a, 7b, 7c, 8, 8a, 9, 9a, 9b, and 10 so as to sandwich them in the widthwise direction of the paper web.

In detail, the shifters 51 and 52 are disposed in each of the parallel planes such that they face each other with a predetermined clearance and are located on the upper and lower sides of the threading-member traveling path 41. As will be described later, the shifter 52 is offset from the shifter 51 by a predetermined amount in the direction of the threading path 41.

As in the first and second embodiments of the present invention, the guide edge 53 (the lower edge in FIG. 10) of the shifter 51 and the guide edge 54 (the upper slanted edge) of the shifter 52 may be located such that they face the arrays of guide pins 21 and 22 of the threading member 20 or such that they face opposite surfaces of the threading member 20 itself.

The guide edge 53 of the shifter 51 is substantially parallel to the threading guide members 7 and 7a, while the guide edge 54 of the shifter 52, which faces the shifter 51, is substantially parallel to the slanted threading guide members 8a and 9a.

The length of the shifter 51 in the direction of the threading path is determined such that the guide edge 53 has a sufficient length so as to simultaneously close the slanted threading-member traveling path 42 at the first branching point and the slanted threading-member traveling path 43 at the second branching point. The length of the shifter 52 in the direction of the threading path is determined such that the guide edge 54 has a sufficient length so as to simultaneously close the straight threading-member traveling path 41 at the first and second branching points.

The positions of the guide edges for the case where the guide edges of the shifters face the arrays of guide pins and for the case where the shifters face the opposite surfaces of the threading member 20 are identical to those in the first embodiment.

When the shifter 51 is positioned to close the slanted threading-member traveling paths 42 and 43, the guide edge 53 of the shifter 51 becomes substantially flat with the guide surfaces of the threading guide members 8, 9, and 7c. When the shifter 52 is positioned to close the straight threading-member traveling path 41, the guide edge 54 of the shifter 52 becomes substantially flat with the guide surfaces of the threading guide members 10 and 9b.

In detail, the guide edge 53 of the shifter 51 has a slanted or arcuate shape in an upstream introduction zone or over the entire length, so that the distance between the guide edge 53 and the threading-member traveling path 41 increases toward the upstream side. This ensures smooth introduction of the threading member 20 into the branching point without causing engagement between the upstream introduction end of the guide edge 53 and the traveling threading member 20. Further, in order to ensure smooth introduction of the threading member 20 into the straight threading-member traveling path 41, the downstream exit end of the guide edge 53 is flush with the guide surfaces of the threading members 9 and 7c or slightly projects therefrom.

In the above-described embodiment, two pairs of shifters are used. However, as in the second embodiment of the present invention, a single pair of shifters, i.e., a shifter 51 formed of a quadrilateral plate and a shifter 52 formed of a trapezoidal plate may be used. The paired shifters 51 and 52 facing each other are disposed at a predetermined position in the widthwise direction of the guide members 7, 7a, 7b, 7c, 8, 8a, 9, 9a, 9b, and 10. Through clearances into which the shifters 51 and 52 move are formed in the guide members 7, 7a, 7b, 7c, 8, 8a, 9, 9a, 9b, and 10 at a widthwise position corresponding to the position of the shifters 51 and 52. This structure is substantially the same as that disclosed in FIGS. 6, 7, and 8.

In the complex branch region 33, a double-acting air cylinder 56 is attached to the inner surface of the frame of the rotary press via a proper bracket 55. The double-acting air cylinder 56 is controlled by an unillustrated outside controller.

To the lower end of a horizontally projecting piston rod 56a of the double-acting air cylinder 56, a shifter mounting bracket 57 is attached via an adjustable mechanism, which makes it possible to adjust the position of the shifter mounting bracket 57 in the operation direction. The shifter mounting bracket 57 has a sufficient length in the direction of the threading path to cover the first and second branching points of the complex branch region 33 and is parallel to the inner surface of the frame.

The based end portions (left end portions in the example shown in FIG. 10) of the shifters 51 are attached to the shifter mounting bracket 57 via parallel mounting pins 17, while the end portions of the shifters 52 opposite the guide edges 54 are attached to the shifter mounting bracket 57 via parallel mounting pins 18. The reference positions of the shifters 51 and 52 are adjusted by the adjusting mechanism.

When the piston rod 56a is retracted as a result of operation of the double-acting air cylinder 56, the shifter mounting bracket 57, i.e., the shifters 51 and 52 are located at the leftward end position in FIG. 10. When the piston rod 56a is located at an intermediate position as a result of operation of the double-acting air cylinder 56, the shifter mounting bracket 57, i.e., the shifters 51 and 52 are located at the intermediate position. When the piston rod 56a is projected as a result of operation of the double-acting air cylinder 56, the shifter mounting bracket 57, i.e., the shifters 51 and 52 are located at rightward end position in FIG. 10.

The mutual positional relationship between shifters 51 and 52 and the positional relationship with respect to the threading-member traveling path 41 are determined as follows.

As shown in FIG. 10, when the shifter mounting bracket 57 is moved to the leftward end position, the guide edges 53 of the shifters 51 are positioned at positions located away from the first and second branching points, while the guide edges 54 of the shifters 52 are located at a guide pin engagement/guidance position or a threading member engagement/guidance position at which the straight threading-member traveling path 41 is closed at the first branching point and the threading guides 7 and 10 are connected. As a result, the threading-member traveling path 40 communicates with the slanted threading-member traveling path 42.

When the shifter mounting bracket 57 is moved to the intermediate position, the guide edges 53 of the shifters 51 are located at a guide pin engagement/guidance position or a threading member engagement/guidance position at which only the slanted threading-member traveling path 42 is closed and the threading guides 8 and 9 are connected. At this time, the guide edges 54 of the shifters 52 are located at a guide pin engagement/guidance position or a threading member engagement/guidance position at which the straight threading-member traveling path 41 is closed at the second branching point and the threading guides 7a and 9b are connected. As a result, the threading-member traveling path 40 communicates with the slanted threading-member traveling path 43.

When the shifter mounting bracket 57 is located at the rightward end position, the guide edges 54 of the shifters 52 are positioned at position located away from the second branching point as well as the first branching point. The guide edges 53 of the shifter 51 are located at a guide pin engagement/guidance position or a threading member engagement/guidance position at which the slanted threading-member traveling path 42 and the slanted threading-member traveling path 43 are simultaneously closed at the first and second branching points and the threading guide members 8, 9 and 7c are connected. As a result, the threading-member traveling path 41 is maintained opened over the entire region of the branching apparatus section of the threading guide of the rotary press.

In the above-described embodiments, instead of the air cylinders 15 and 56, a hydraulic cylinder or an electromagnetic drive apparatus may be used as means for vertically moving the shifter mounting bracket 16 or as means for horizontally moving the shifter mounting bracket 57.

Next, a description will be given of the operations of the branching apparatuses for the threading guide of the rotary press.

For the first embodiment, the operation of the branching apparatus shown in FIGS. 1–4 will be described.

In the threading path from the upstream paper feed section to the downstream folding section, the threading member 20 having a paper-web bonding portion 20a, to which the forward end of each transverse edge of the paper web W is attached, is caused to travel along a predetermined threading-member traveling path while being guided by the threading guide. As a result, the paper web W is threaded along a predetermined threading path.

At the branching point of the threading path, the threading member 20 travels toward the threading-member traveling path selected by the threading path switching apparatus, so that the paper web W is also threaded toward a predetermined threading path selected accordingly.

In detail, the threading member 20 travels along the threading-member traveling path 40, while being guided by the threading guide members 5 and 6 in the single path region 31, and then reaches the branch region 32 of the threading guide in which the threading member 20 is guided by the threading guide members 7 and 8 to the branching point.

When it is desired to allow the threading member 20 to travel in straight from the threading-member traveling path 40 to the threading-member traveling path 41, the air cylinder 15 is operated such that the shifter mounting bracket 16, i.e., the shifters 11a, 11b, 12a, and 12b are moved to the lowered position via the piston rod 15a.

With this operation, the guide edges 14a and 14b of the shifters 12a and 12b are separated away from the threading-member traveling path 40, while the guide edges 13a and 13b of the shifters 11a and 11b are located at a guide pin engagement/guidance position or a threading member engagement/guidance position at which the threading-member traveling path 42 is closed at the branching point and the threading guide members 8 and 9 are connected. As a result, the threading member 20 travels into the threading-member traveling path 41 formed by the guide members 9 and 7a in a state in which the upper ends of the guide pins 21 and 22 of the threading member 20 are guided by the guide edges 13a and 13b of the shifters 11a and 11b, or in a state in which the threading member 20 itself is guided by the guide edges 13a and 13b of the shifters 11a and 11b and the threading guide members 7 and 7a.

When it is desired to allow the threading member 20 to travel from the threading-member traveling path 40 to the slanted threading-member traveling path 42, the air cylinder 15 is operated such that the shifter mounting bracket 16, i.e., the shifters 11a, 11b, 12a, and 12b are moved to the elevated position via the piston rod 15a.

With this operation, the guide edges 13a and 13b of the shifters 11a and 11b are separated away from the threading-member traveling path 40, while the guide edges 14a and 14b of the shifters 12a and 12b are located at a guide pin engagement/guidance position or a threading member engagement/guidance position at which the straight threading-member traveling path 41 is closed at the branching point and the threading guide members 7 and 10 are connected. As a result, the threading member 20 travels into the threading-member traveling path 42 formed by the guide members 8a and 10 in a state in which the lower ends of the guide pins 21 and 22 of the threading member 20 are guided by the guide edges 14a and 14b of the shifters 12a and 12b, or in a state in which the threading member 20 itself is guided by the guide edges 14a and 14b of the shifters 12a and 12b and the threading guide members 7 and 10.

The operation of the branching apparatus according to the second embodiment (which has a single pair of shifters) is substantially the same as that of the branching apparatus according to the first embodiment. At the branching point, the guide edges 13 and 14 of the shifters 11 and 12 close the corresponding threading-member traveling path or are located at the guide pin engagement/guidance position or threading member engagement/guidance position for connecting the threading guide members that form a threading-member traveling path to which the threading member is to be guided. As a result, the arrays of guide pins 21 and 22 or the threading member 20 itself is allowed to travel to a predetermined threading-member traveling path selected by the shifters 11 and 12.

In the third embodiment shown in FIG. 10, at each of the plurality of branching points, the threading member 20 is caused to travel to a predetermined threading-member traveling path selected by the threading path switching apparatus. Consequently, the paper web W is threaded along a predetermined threading path selected accordingly.

In the complex branch region 33, the threading member 20 is caused to travel to one of the three threading-member traveling paths 41, 42 and 43 by operating the threading path switching apparatus C as follows.

When the shifter mounting bracket 57, i.e., the shifters 51 and 52 are located at the rightward end position by the double-acting air cylinder 56 via the piston rod 56a, the guide edges 54 of the shifters 52 are positioned at position located away from the second branching point as well as the first branching point, while the guide edges 53 of the shifter 51 are located at a guide pin engagement/guidance position or a threading member engagement/guidance position at which the slanted threading-member traveling paths 42 and 43 are closed at the first and second branching points and the threading guide members 8, 9 and 7c are connected. As a result, the threading member 20 travels into the threading-member traveling path 41 formed by the guide members 7b and 7c in a state in which the upper ends of the guide pins 21 and 22 of the threading member 20 are guided by the guide edges 53 of the shifters 51, or in a state in which the threading member 20 itself is guided by the guide edges 53 of the shifters 51 and the threading guide members 7, 7a and 7b.

When the shifter mounting bracket 57, i.e., the shifters 51 and 52 are located at the intermediate position by the double air cylinder 56 via the piston rod 56a, the guide edges 53 of the shifters 51 are located at a guide pin engagement/guidance position or a threading member engagement/guidance position at which the slanted threading-member traveling path 42 is closed at the first branching point and the threading guide members 8 and 9 are connected. Also, the guide edges 53 of the shifters 51 open the slanted threading-member traveling path 43 at the second branching point.

The guide edges 54 of the shifters 52 are located at a guide pin engagement/guidance position or a threading member engagement/guidance position at which the straight threading-member traveling path 41 is closed at the second branching point and the threading guide members 7a and 9b are connected. As a result, the threading-member traveling path 40 communicates with the slanted threading-member path 43.

Accordingly, the threading member 20 travels into the threading-member traveling path 43 formed by the guide members 9b and 9b in a state in which the upper ends of the guide pins 21 and 22 of the threading member 20 are guided by the guide edges 53 of the shifters 51 and the lower ends of the guide pins 21 and 22 are guided by the guide edges 54 of the shifters 52, or in a state in which the threading member 20 itself is guided by the guide edges 53 of the shifters 51 and the threading guide members 7 and 7a and also guided by the threading guide member 9a and the guide edge 54 of the shifter 52.

When the shifter mounting bracket 57, i.e., the shifters 51 and 52 are located at the leftward end position by the double air cylinder 56 via the piston rod 56a, the guide edges 53 of the shifters 51 are positioned at position located away from the second branching point as well as the first branching point, while the guide edges 54 of the shifter 52 are located at a guide pin engagement/guidance position or a threading member engagement/guidance position at which the straight threading-member traveling path 41 is closed at the first branching point and the threading guide members 7 and 10 are connected, so that the threading-member traveling path 40 communicates with the slanted threading-member traveling path 42. As a result, the threading member 20 travels into the threading-member traveling path 42 formed by the guide members 8a and 10 in a state in which the lower ends of the guide pins 21 and 22 of the threading member 20 are guided by the guide edges 54 of the shifters 52, or in a state in which the threading member 20 itself is guided by the guide edges 54 of the shifters 52 and the threading guide members 8a.

In the above-described branching apparatuses for threading according to the respective embodiments, a single threading-member traveling path is formed on the upstream side and is then branched into a plurality of threading-member traveling paths on the downstream side, and the threading member travels from the upstream single threading-member traveling path to the downstream plurality of threading-member traveling paths. However, the branching apparatuses for threading according to the above-described embodiments can be applied to the type in which a plurality of threading-member traveling paths are provided on the upstream side and they are merged into a single threading-member traveling path on the downstream side, and in which a paper-web bonding member is bonded to the edge portion of a threading strip serving as the threading member is threaded over the entire area of the threading path from the upstream side to the downstream side and is caused to travel for performing threading. That is, the above-described type can be used in the case where the threading member is caused to travel along selected threading-member traveling path from the upstream side to the lower stream side for forming a threading path.

It is easily understood that in this case as well, the guide edges of the shifters are formed such that they do not hinder smooth travel of the threading member, including the guide pins, from the downstream side to the upstream side.

Obviously, numerous modifications and variations of the present invention are possible in light of the above teachings. It is therefore to be understood that within the scope of the appended claims, the present invention may be practiced otherwise than as specifically described herein.

What is claimed is:

1. A paper-web threading guide for a rotary press containing threading paths formed by pairs of mutually spaced threading guide members having continuously formed surfaces facing one another which form said threading path for travel of a threading member, said threading guide containing a single upstream threading path and a plurality of downstream threading paths, a branch threading guide portion in which said plurality of downstream threading paths unite with said upstream threading path, a shifter mechanism mounted to said threading guide at said branch threading guide portion, said shifter mechanism including a mounting bracket movable between operative positions spaced transversely of said downstream threading paths, a pair of mutually spaced, oppositely facing shifters fixedly secured to said mounting bracket, said shifters each containing a guide edge operative to engage said threading member at said upstream threading path and to guide said threading member to a different selected downstream threading path in accordance with the position of said mounting bracket, the guide edge on each shifter being disposed in facing relation with respect to the guide edge on said oppositely spaced shifter, and means for moving said mounting bracket in a reciprocating manner transversely of said threading paths for selectively positioning said shifters.

2. A paper-web threading guide for a rotary press according to claim 1, wherein said shifter mechanism guide edges have a camming surface in which the distance between the guide edge and the threading-member traveling path increases toward the upstream side.

3. A paper-web threading guide for a rotary press according to claim 2, wherein said shifter mechanism includes two pairs of shifters disposed along two parallel planes and being operative to restrict widthwise sides of a forward end portion of said threading member to guidingly introduce the threading member into a selected downstream threading-member traveling path.

4. A paper-web threading guide for a rotary press according to claim 2, wherein said shifter mechanism includes a single pair of shifters disposed along a single plane penetrating the branch threading guide, said shifters being operative to restrict a widthwise center portion of a forward end portion of said threading member to guidingly introduce the threading member into a selected downstream threading-member traveling path.

5. A paper-web threading guide for a rotary press according to claim 2 wherein said camming surface is defined by a slating shape.

6. A paper-web threading guide for a rotary press according to claim 2 wherein said camming surface is defined by an arcuate shape.

7. A paper-web threading guide for a rotary press according to claim 1, wherein said shifter mechanism includes two pairs of shifters disposed along two parallel planes and being operative to restrict widthwise sides of a forward end portion of said threading member to guidingly introduce the threading member into a selected downstream threading-member traveling path.

8. A paper-web threading guide for a rotary press according to claim 1, wherein said shifter mechanism includes a single pair of shifters disposed along a single plane penetrating the branch threading guide, said shifters being operative to restrict a widthwise center portion of a forward end portion of said threading member to guidingly introduce the threading member into a selected downstream threading-member traveling path.

* * * * *